United States Patent
Seul et al.

(10) Patent No.: US 12,407,787 B2
(45) Date of Patent: Sep. 2, 2025

(54) DISPLAY CASE WITH TRANSPARENT DISPLAY FOR WATERMARKING

(71) Applicant: International Business Machines Corporation, Armonk, NY (US)

(72) Inventors: Matthias Seul, Pleasant Hill, CA (US); Dulce B. Ponceleon, Palo Alto, CA (US); Petr Novotny, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 779 days.

(21) Appl. No.: 17/527,094

(22) Filed: Nov. 15, 2021

(65) Prior Publication Data

US 2023/0156137 A1  May 18, 2023

(51) Int. Cl.
*A47F 3/00* (2006.01)
*A47G 1/06* (2006.01)
*G06T 1/00* (2006.01)
*H04N 1/32* (2006.01)
*G06Q 30/0645* (2023.01)

(52) U.S. Cl.
CPC ..... *H04N 1/32325* (2013.01); *H04N 1/32267* (2013.01); *A47F 3/002* (2013.01); *A47G 1/06* (2013.01); *G06Q 30/0645* (2013.01); *G06T 1/0021* (2013.01)

(58) Field of Classification Search
CPC .................................. A47F 3/002; A47G 1/06
See application file for complete search history.

(56) References Cited

U.S. PATENT DOCUMENTS

| | | | |
|---|---|---|---|
| 4,593,376 A | 6/1986 | Volk | |
| 7,248,715 B2 | 7/2007 | Levy | |
| 7,720,249 B2 | 5/2010 | Rhoads | |
| 9,454,790 B2 | 9/2016 | Kim | |
| 9,589,111 B2 | 3/2017 | Stefik | |
| 2006/0064700 A1* | 3/2006 | Ludvig | H04N 21/4424 719/318 |
| 2008/0104545 A1* | 5/2008 | Palmieri | G06Q 20/10 715/847 |
| 2009/0136081 A1* | 5/2009 | Mamidwar | H04N 21/6581 382/100 |
| 2014/0283425 A1* | 9/2014 | Vallar | A47G 1/0616 40/745 |

(Continued)

FOREIGN PATENT DOCUMENTS

| | | | | |
|---|---|---|---|---|
| CN | 103526648 A | | 1/2014 | |
| CN | 105962692 A | * | 9/2016 | |
| JP | 2018153620 A | * | 10/2018 | ............. A47F 11/06 |

OTHER PUBLICATIONS

Eileen, "Glass watermark now available", Jul. 7, 2016, Glass Paint, 3 pps., <https://glasspaint.com/glass-watermark-now-available/>.

(Continued)

*Primary Examiner* — William R Korzuch
*Assistant Examiner* — Aditya Sriram
(74) *Attorney, Agent, or Firm* — Scott Dobson (57) ABSTRACT

A display case is provided. The display case includes a transparent display for viewing an object through the transparent display and a watermarking engine configured to display a watermark on the transparent display.

10 Claims, 7 Drawing Sheets

(56) References Cited

U.S. PATENT DOCUMENTS

| | | | |
|---|---|---|---|
| 2016/0106233 A1* | 4/2016 | Mitchell | A47F 3/005 312/138.1 |
| 2017/0163839 A1 | 6/2017 | Arana | |
| 2017/0285860 A1* | 10/2017 | Siddiq | G06F 3/045 |
| 2023/0018806 A1* | 1/2023 | Eizman | A47G 1/06 |

OTHER PUBLICATIONS

Rizzo, et al., "Fine-grain watermarking for intellectual property protection", 2019, EURASIP Journal on Information Security, 2019(1), 10, 20 pps.

Vogt, ImageSpan and Digimarc Partner to Deliver Complete Solution to Manage, Monitor and Monetize Valuable Image Assets, Nov. 11, 2009, 3 pps., <https://www.digimarc.com/about/news-events/press-releases/2009/11/11/imagespan-and-digimarc-partner-to-deliver-complete-solution-to-manage-monitor-and-monetize-valuable-image-assets>.

* cited by examiner

DISPLAY CASE WITH TRANSPARENT DISPLAY FOR WATERMARKING

BACKGROUND

The present disclosure relates to electronic watermarks, and more specifically, to electronic watermarks for usage measurement and usage rights enforcement.

Often, physical works of art are rented out for a period of time. For example, an owner may transfer a painting to a museum to display and have the painting returned after a period of time. While the rental agreement may include specific limitations regarding the display of the art, it may be difficult for the owner of the art to measure and enforce the limitations while it is out of their possession.

SUMMARY

According to embodiments of the present disclosure, a display case is provided. The display case includes a transparent display for viewing an object through the transparent display and a watermarking engine configured to display a watermark on the transparent display.

According to further embodiments of the present disclosure, a computer-implemented method is provided. The method includes displaying, on a transparent display of a display case, a watermark containing watermarking information, the transparent display for viewing an object within the display case.

According to further embodiments of the present disclosure, a computer program product for performing the method is provided.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to displaying watermarks on a transparent screen, and more particular aspects relate to generating the watermarks on a transparent screen for usage measurement and usage rights enforcement for physical objects within a display case. While the present disclosure is not necessarily limited to such applications, various aspects of the disclosure may be appreciated through a discussion of various examples using this context.

Owners of physical artwork are limited in their ability to enforce restrictions on the usage of their artwork when it is rented out. For example, the owner can deliver the artwork to a renter at a specific time and pick up the artwork at a specific time, but the owner generally does not have any control over the artwork while it is in the renter's possession. Thus, it is difficult for the owner to monitor the use of the artwork for violations of certain restrictions in the rental contract.

Embodiments of the present disclosure provide a display case for displaying physical objects with a transparent display for displaying watermarks for usage measurement and usage rights enforcement. The display case includes a watermarking engine that generates watermarks to be displayed on the transparent display. The transparent display may provide the ability to view objects placed within the enclosure through the transparent display while displaying generated watermarks.

The display case may include a back panel and a transparent display affixed to the back panel. In some embodiments, the display case may further include one or more side panels. The back and side panels may be opaque such that an object within the display case can only be viewed through the transparent display. The back and side panels may be made of any suitable material. The watermarking engine may be located within the back panel of the display case and communicatively coupled to the transparent display. The watermarking engine may be a combination of hardware and software configured to perform logical functions. For example, the watermarking engine may include a processor and a memory. In some embodiments, there may be more than one transparent display with a transparent display on more than one side of the display case. The transparent display may use any suitable technology such as liquid crystal display (LCD), light-emitting diode (LED), or electronic paper (e-paper). The display case may have an electrical plug for providing external power to the watermarking engine and the transparent display. The display case may further contain a backup battery that can power the watermarking engine and the transparent display for a period of time when the display case is not connected to an external power source.

The watermarking engine may generate watermarks that contain information that can be used for usage measurement and usage rights enforcement. The watermark may take any suitable form for communicating information. In some embodiments, watermarks may include a Quick Response (QR) code or a Uniform Resource Locator (URL). The watermark may be designed to blend in with display case and/or the object within the display case such that the watermark is not obtrusive. The watermarking engine may be provided with an image of the object and select different colors, patterns, location, etc., for the watermark to blend in with the object.

The watermark may contain information such as a unique identifier, a timestamp, a validity period, a location indicator, and a signature. The unique identifier may be a unique value that is associated with the object within the display case. The timestamp may be a time when the unique identifier was created. The validity period may be a period of time during which the watermark is valid. The location indicator may be the current location or an indication that the display case is in a specific location. The signature may be cryptographic signature to verify that the watermark is valid.

The unique identifier may be generated by a management system and communicated to the watermarking engine. The management system may maintain a registry that associates objects and their unique identifiers. This may allow for users to verify unique identifiers obtained from watermarks. Each identifier may be associated with a specific rental contract such that the identifier is changed each time the object is rented to a new party or subject to a new rental contract. The registry may identify the owner or manager of the object, who is authorized to display the object, and when the object is allowed to be displayed. The management system may communicate with the watermarking engine over one or more networks.

The timestamp and validity period may also be generated by the management system and communicated to the watermarking engine. The management system may generate the timestamp to indicate the time when the unique identifier was created. The validity period may be a duration of time during which the identifier is valid. For example, the validity period may be a time value expressed in seconds that indicates that the amount of time that the unique identifier is valid after the time indicated in the timestamp.

Alternatively, the timestamp may be a current timestamp that is generated by the watermarking engine. The timestamp may be generated at specific intervals such as, for example, every minute. This timestamp may be included in the watermark. In some embodiments, the location of the watermark may indicate the timestamp. For example, the timestamp may be used to select the coordinates for watermark on the transparent display, thus providing the timestamp information using the location of the watermark on the transparent display. In these embodiments, the validity period may be a specific time or range of time during which the unique identifier is valid. For example, the validity period may be a time at which the unique identifier expires or the start time and stop time during which the unique identifier is valid.

The location indicator may be based on any suitable location identifying methods. In some embodiments, location indicator may be based on a GPS location determined by a GPS device of the display case. In some embodiments, the location indicator may be determined based on communication networks using, for example, a Wi-Fi positioning system (WPS). In some embodiments, the location indicator may be the determined location of the display case. In other embodiments, the location indicator may be an indication of whether the determined location is within a geofence. For example, the management system may set a geofence based on location restrictions in the rental contract and communicate the geofence to the watermarking engine. The watermarking engine may then use any suitable location identifying method to determine whether it is located within the geofence and set an indicator accordingly.

The cryptographic signature may be an encryption of information in the watermark. In some embodiments, one or more of the unique identifier, timestamp, validity period, and location may be encrypted. The cryptographic signature may use asymmetric cryptography. For example, the watermarking engine may encrypt the information using a private key and the data may be retrieved from the watermark using a public key.

Displaying a watermark on the transparent display may allow an owner to measure and enforce the usage of their objects by obtaining an image of the display. This may include indirect verification or ad-hoc verification by a third-party. For example, an owner may perform indirect verification by monitoring photos of the object posted on social media by people viewing the object. The owner may locate the watermark within the posted picture and use the information contained within the watermark to verify the condition of the object at the time that the photo was taken. Alternatively, the owner may perform ad-hoc verification, for example, by requesting that the current custodian of the object take a photo of the object and provide the photo to the owner. The owner may use a digital signature in the watermark to verify that the photo is legitimate, may use a timestamp in the watermark to verify the time that the photo was taken, and may use the watermark to verify that the display case has not been tampered with.

In some embodiments, the identifier is issued on demand by the management system. Thus, the entity renting the object may request an identifier from the management system and the management system may verify that the requestor is authorized before communicating the identifier to the watermarking engine of the display case.

In some embodiments, a new identifier is periodically issued by the management system to the watermarking engine of the display case. The identifier may be a unique randomly generated fixed size ID that is recorded along with the validity period of the identifier. In some embodiments, this information is recorded in an immutable ledger such as a blockchain.

In some embodiments, the watermarking engine may change the display to cause the transparent display to diminish the ability to view or enjoy the object within the display case when the rental agreement indicates that the object should no longer be displayed. This may also include removing the watermark from the display. For example, the watermarking engine may be configured to diminish the ability to view the object when the unique identifier has expired based on the validity period and the timestamp. In some embodiments, the watermarking engine may generate a display that changes the opacity of some or all of the transparent display. For example, the watermarking engine may display an image across the entire transparent display to cause the transparent display to become opaque. As another example, the watermarking engine may cause the transparent display to have 50% opacity. In some embodiments, the watermarking engine may display a message across the transparent display. For example, the watermarking engine may display a message that a license to display the object has expired. The message may contain further information such as contact information for the owner. In some embodiments, an image that interferes with the ability to enjoy viewing the object may be displayed on the transparent display. For example, a large "X" may be displayed across the transparent display. One or more of the displays described above may be combined in some embodiments. For example, the watermarking engine may change the opacity of the transparent display, display a message, and display an image.

In some embodiments, the watermarking engine may be configured to change the display, as described above, during certain times of the day. For example, the rental agreement may state that the object may be displayed between 10:00 a.m. and 3:00 p.m. In this example, the corresponding validity period may be 10:00 a.m. to 3:00 p.m. The watermarking engine may be configured to determine the current time using an internal clock and/or retrieving a current time over one or more networks.

In some embodiments, the watermarking engine may change the display in response to receiving a signal from a tamper sensor. This may include removing the watermark from the display. Any suitable tamper sensor could be used such as an optical or magnetic sensor. The sensors may be arranged such that a signal is communicated to the watermarking engine in response to attempts to open the display case to access the object or access the watermarking engine. In some embodiments, in response to receiving a signal from a tamper sensor, the watermarking engine may diminish the ability to view or enjoy the object within the display case as described above. In some embodiments, the watermarking engine may be configured to display a conspicuous mark using text, color, size, etc. to easily indicate to viewers that an attempt to tamper with the display case was detected. For example, the watermarking engine may display text in large red letters on the transparent display that states "Tamper Attempt Detected". In some embodiments, the watermarking engine may be configured to return to the display to just displaying the watermark in response to a communication from the management system.

In some embodiments, the watermarking engine may be configured to change the display in response to an anticipated loss of power. For example, when operating on backup battery power, the watermarking engine may be configured to change the display when the power level of the battery reaches a threshold level (e.g., 5% battery power remaining). In some embodiments, the transparent display may be configured to diminish the ability to view or enjoy the object within the display case in response to an anticipated loss of power. This may be particularly useful where the transparent display does not require a power source to maintain its display (e.g., e-paper). The transparent display may be configured to display an image or text indicating that the display case needs be connected to a power source.

Figure 1:
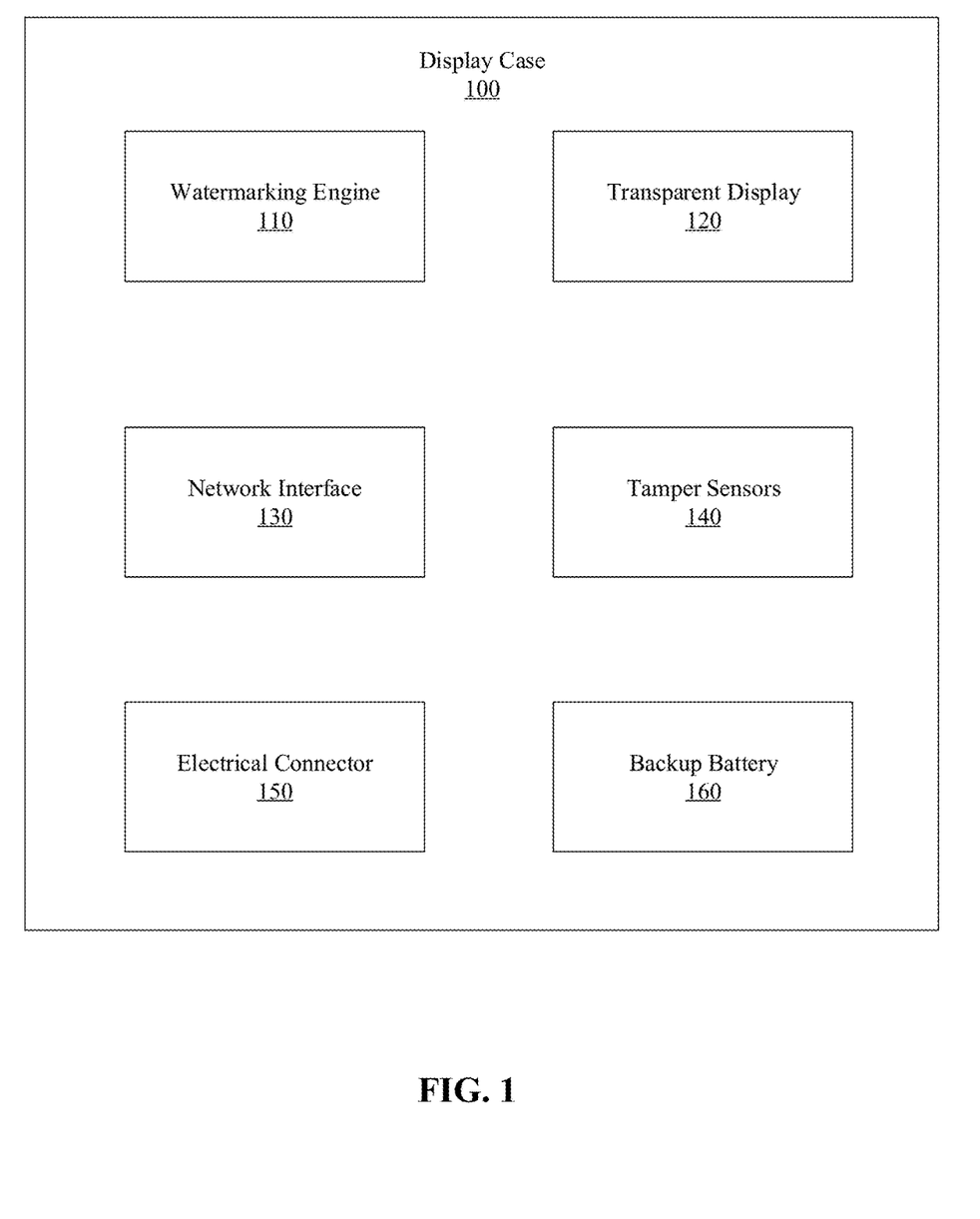
FIG. 1 depicts a block diagram of components of a display case according to embodiments.

Referring now to FIG. 1, a block diagram of components of a display case 100 is depicted according to embodiments. Display case 100 includes watermarking engine 110, transparent display 120, network interface 130, tamper sensors 140, electrical connector 150, and backup battery 160. Watermarking engine 110 may be a combination of hardware and software configured to display watermarks on transparent display 120. Transparent display 120 may be any suitable transparent display as described herein. Network interface 130 may be one or more network interfaces configured to communicate over wireless and/or wired networks. Tamper sensors 140 may be any suitable type of tamper sensor as described herein. Electrical connector 150 may be any suitable electrical connector for connecting one or more components of display case 100 to an external power source. Backup battery 160 may be any suitable type of battery. Backup battery 160 may be configured to be charged when display case 100 is connected to an external power source via electrical connector 150 and configured to provide power to one or more components of display case 100 is not connected to an external power source.

Figure 2:
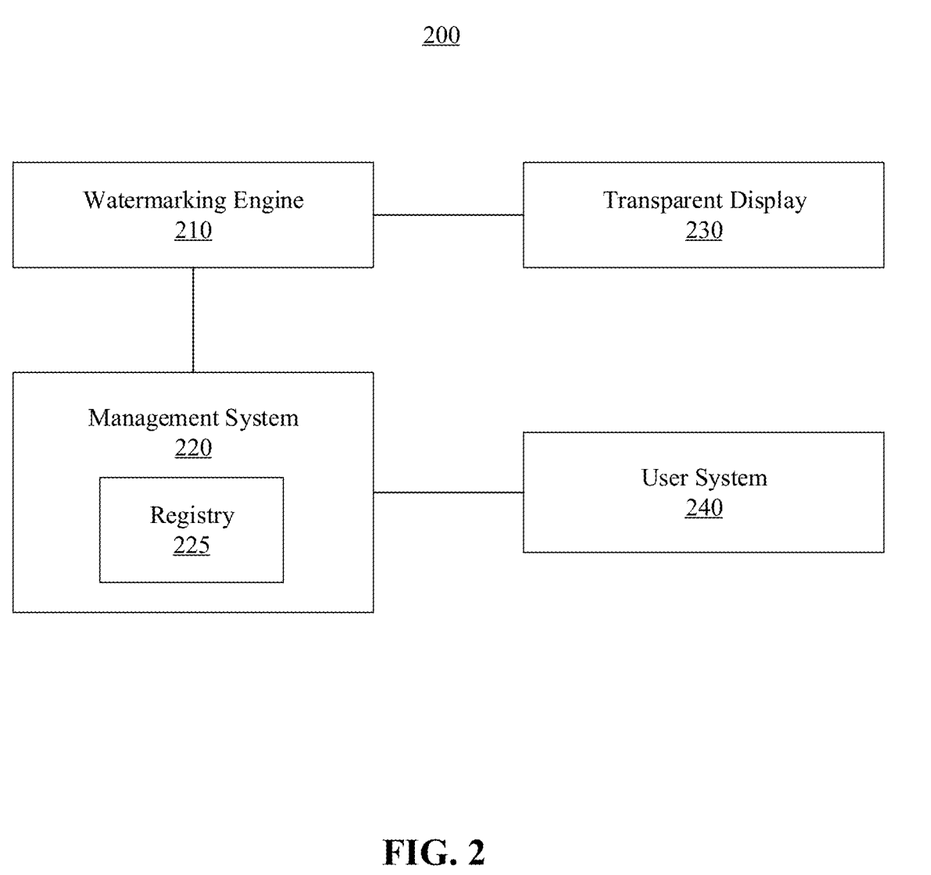
FIG. 2 depicts an illustrative block diagram of a computing environment according to embodiments.

Referring now to FIG. 2, an illustrative block diagram of a computing environment 200 is depicted according to embodiments. Environment 200 includes watermarking engine 210, management system 220, transparent display 230, and user system 240. Watermarking engine 210 may be configured to communicate with management system 220 over one or more networks. Management system 220 may be configured to generate watermarking information and communicate the information to watermarking engine 210. Watermarking information may include a unique identifier, a timestamp, a validity period, a location indicator, and a signature as described herein. Management system 220 may maintain a registry containing watermarking information for one or more objects and/or display cases. As discussed herein, watermarking engine 210 may generate a watermark and display it on transparent display 230. A user may capture the watermark using user system 240. For example, user system 240 may be receive an image of the watermark taken by a camera. User system 240 may be configured to communicate with management system 220 over one or more networks to verify at least some of the information contained within the watermark. Watermarking engine 210, management system 220, and user system 240 may be implemented using any appropriate computing device.

Figure 3:
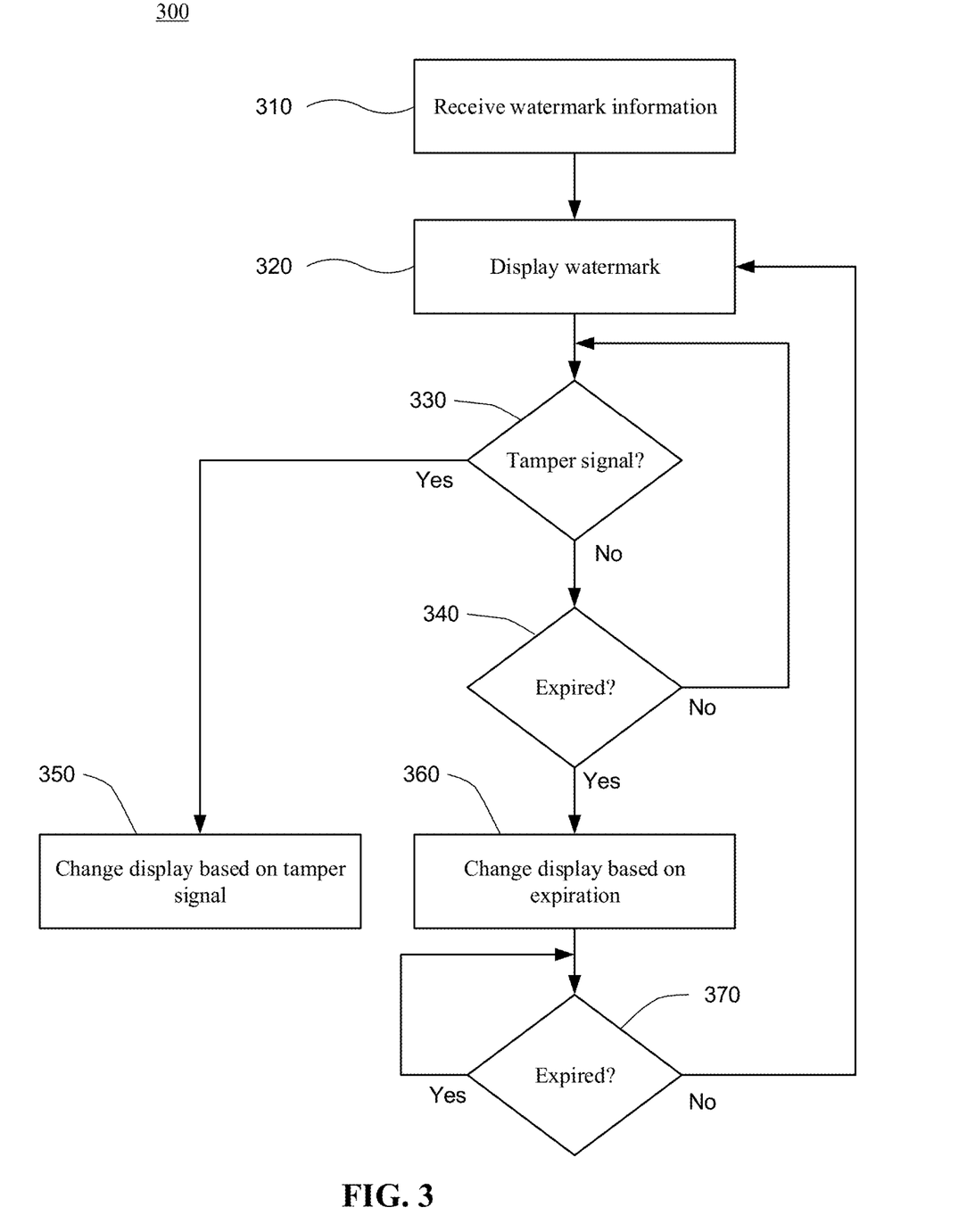
FIG. 3 depicts a flowchart of an example method for controlling a transparent display of a display case according to embodiments.

Referring now to FIG. 3, a flowchart of an example method 300 for controlling a transparent display of a display case is depicted according to embodiments. Method 300 may be performed by a watermarking engine as described herein. At operation 310, watermarking information may be received by the watermarking engine. The information may be received from a management system over one or more wired and/or wireless networks. At operation 320, the watermarking engine may generate and display a watermark containing some or all of the watermarking engine on the transparent display. At operation 330, the watermarking engine determines whether a tamper signal has been received from a tamper sensor. If a tamper signal has been received, at operation 350 the watermarking engine may change the display based on receiving the tamper signal as described herein. If a tamper signal has not been received, the watermarking engine may determine whether the watermark has expired. For example, the watermarking engine may determine whether a unique identifier is still valid based on a timestamp and a validity period as described herein. If the watermark has not expired, the watermarking engine may continue to perform operations 330 and 340 until a tamper signal is detected or the watermark has expired. If the watermark has expired, at operation 360 the watermarking engine may change the display based on the expiration as described herein. In embodiments where the watermark may become valid at a later time, at operation 370 the watermarking engine may continuously or periodically check whether the watermark is still expired. For example, when the validity period is between 10:00 a.m. and 3:00 p.m. each day, the watermark may be valid again after 10:00 a.m. Once the watermark is no longer expired, the watermarking engine may return to operation 320 and change the display to display the watermark.

Figure 4A:
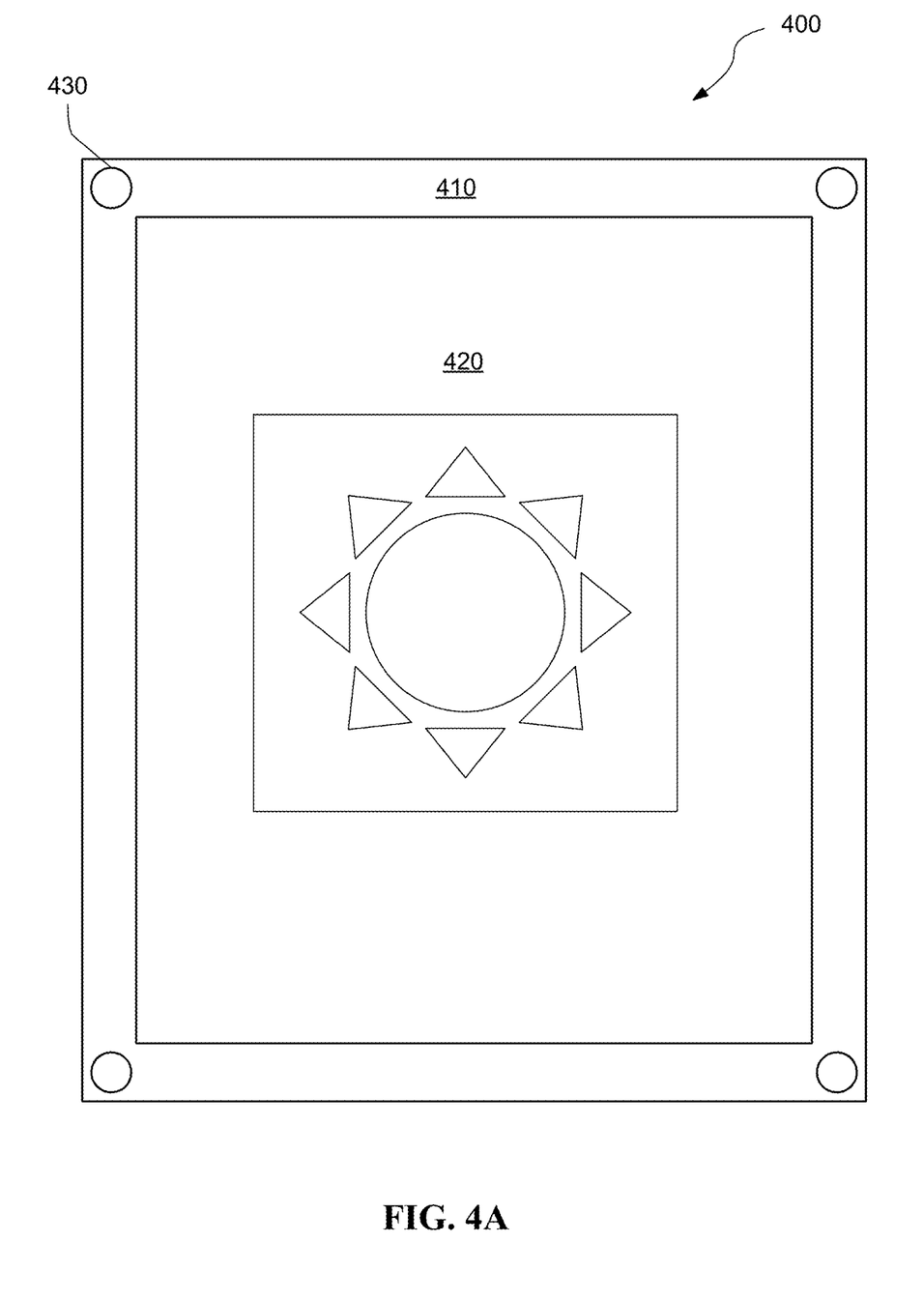
FIGS. 4A-4B depict an example display case according to embodiments.
Figure 4B:
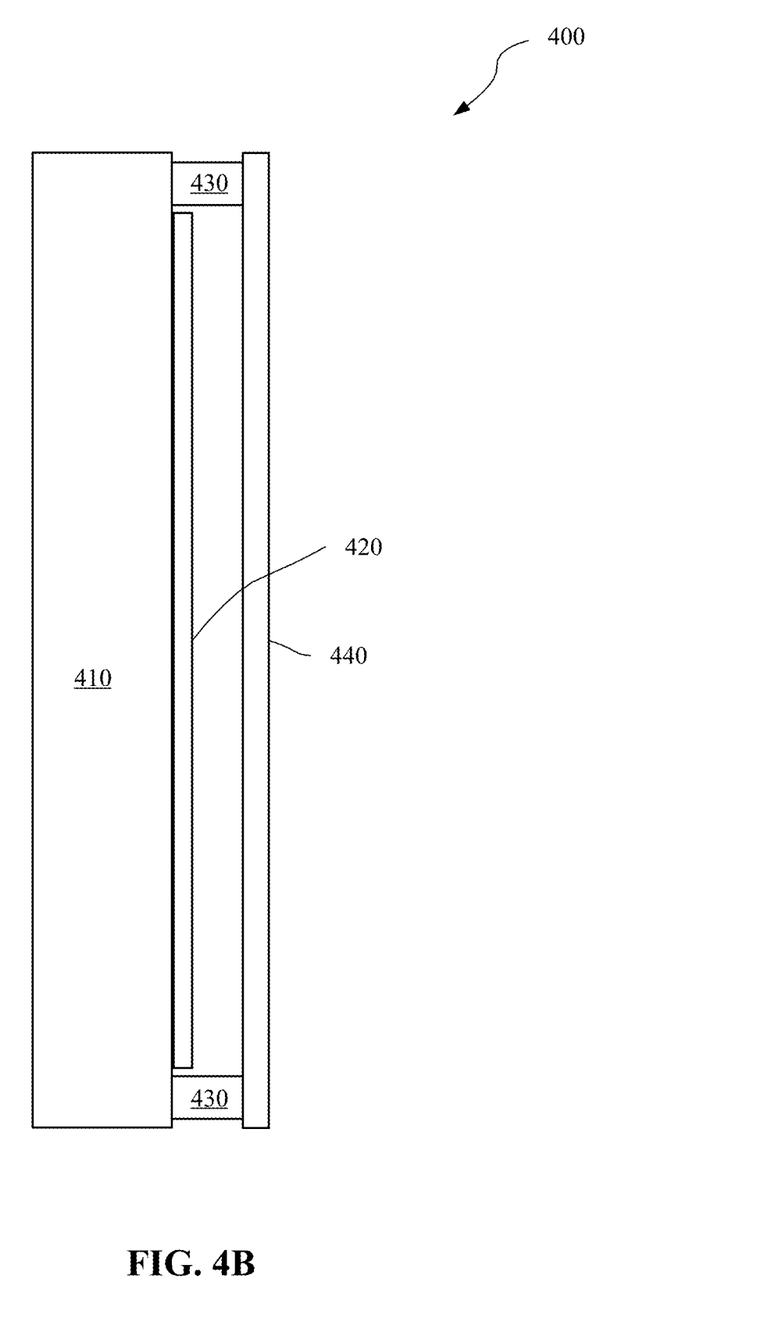

Referring to FIGS. 4A and 4B, an example display case 400 is depicted according to embodiments. Display case 400 includes a back panel 410, an object 420, connectors 430, and transparent display 440. Back panel 410 may contain the watermarking engine and other components described above in reference to FIG. 1. Object 420 may be, for example, a picture, drawing, or painting of a sun. Connectors 430 may connect back panel 410 to transparent display 440. One or more of connectors 430 may contain connections for electronic communication between the watermarking engine in back panel 410 and transparent display 440. FIG. 4A shows a front view of the back panel 410, object 420, and connectors 430 of display case 400. While transparent display 440 is not depicted in FIG. 4A, it may be affixed to the back panel via connectors 430 as shown in FIG. 4B. FIG. 4B shows a side view of the back panel 410, object 420, connectors 430, and transparent display 440.

Figure 5A:
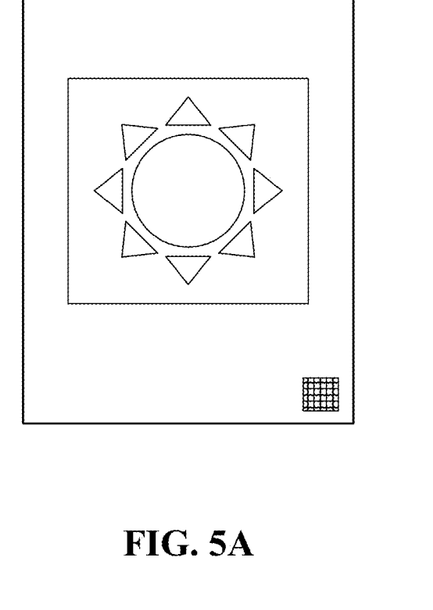
FIGS. 5A-5D depict example displays on a transparent display according to embodiments.
Figure 5B:
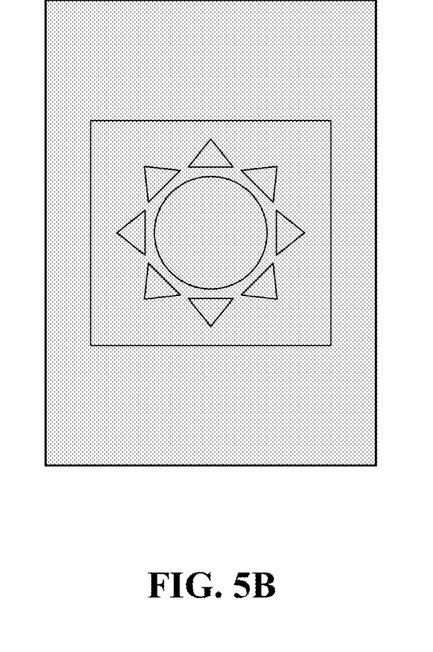
Figure 5C:
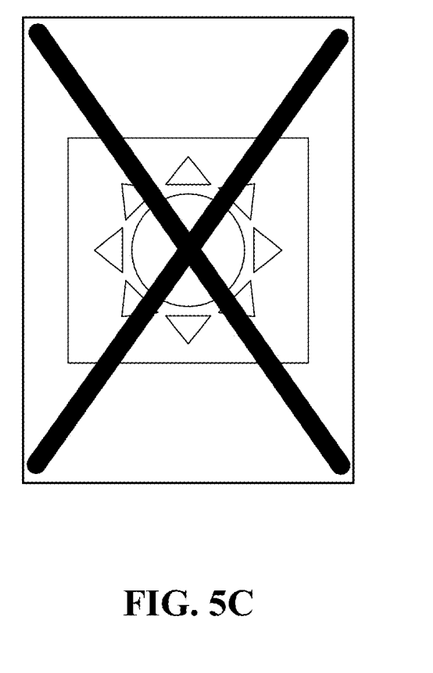
Figure 5D:
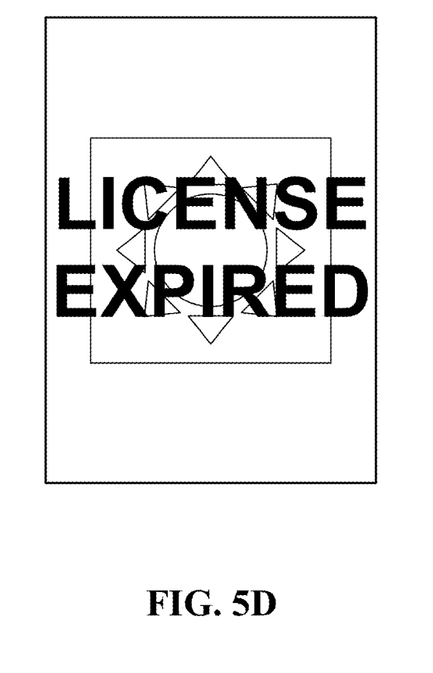

Referring now to FIGS. 5A-5D, example displays on a transparent display with a drawing of a sun visible through the transparent display. FIG. 5A depicts the transparent display with a watermark in the lower right corner of the display. FIG. 5B depicts the transparent display with increased opacity which may be intended to diminish the ability to view or enjoy the drawing. FIG. 5C depicts the transparent display with a large "X" across the display which may be intended to diminish the ability to view or enjoy the drawing. FIG. 5D depicts the transparent display with the text "LICENSE EXPIRED" displayed in large bold text across the display which may be intended to indicate that the watermark has expired and to diminish the ability to view or enjoy the drawing.

Figure 6:
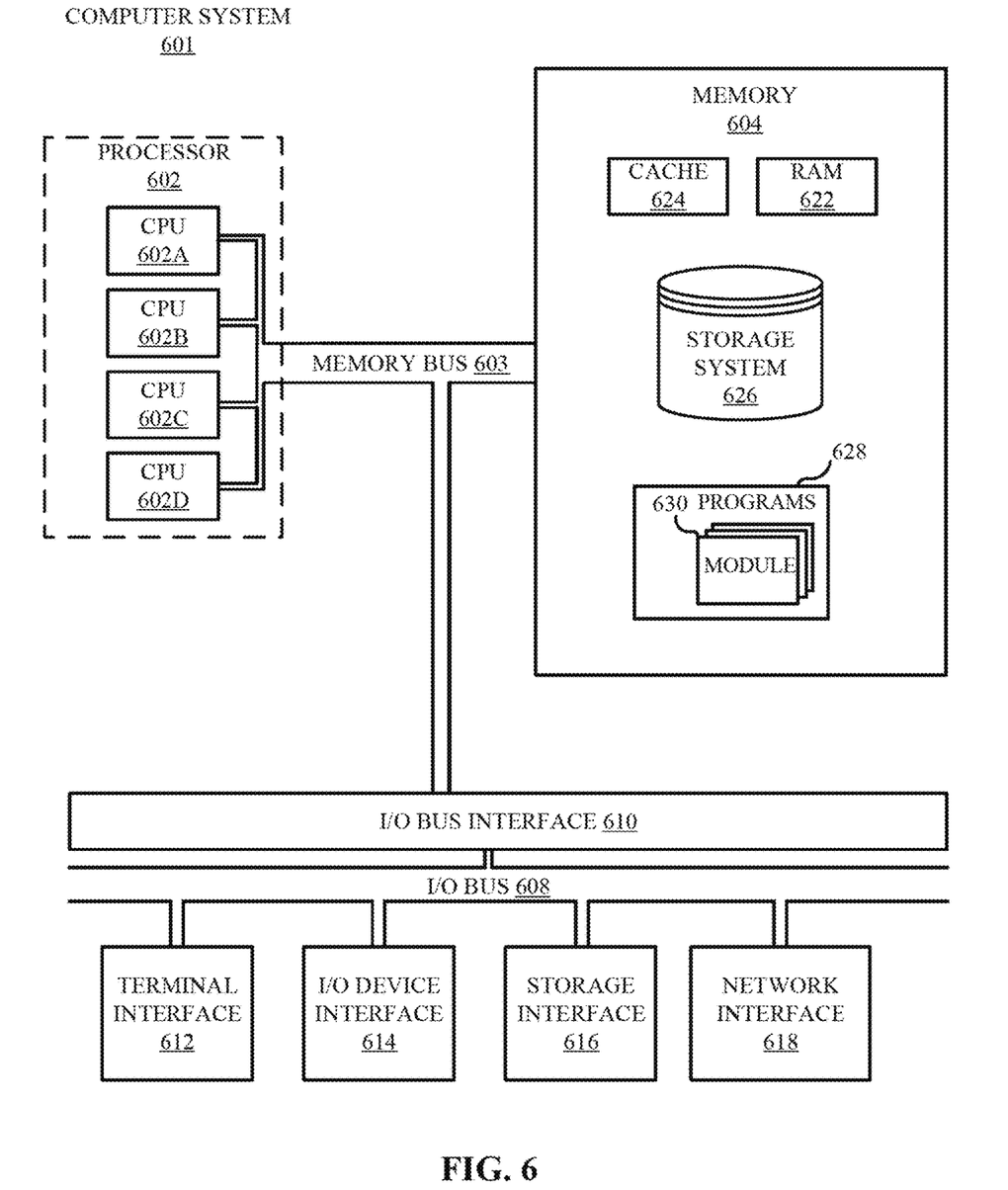
FIG. 6 depicts a high-level block diagram of an example computer system according to embodiments.

Referring now to FIG. 6, shown is a high-level block diagram of an example computer system 601 that may be used in implementing one or more of the methods, tools, and modules, and any related functions, described herein (e.g., using one or more processor circuits or computer processors of the computer), in accordance with embodiments of the present disclosure. For example, computer system 101 may be used as watermarking engine 210, management system 220, or user system 240 described in reference to FIG. 2. In some embodiments, the major components of the computer system 601 may comprise one or more CPUs 602, a memory subsystem 604, a terminal interface 612, a storage interface 616, an I/O (Input/Output) device interface 614, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 630 generally perform the functions or methodologies of various embodiments.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A display case comprising:
   a transparent display for viewing an object through the transparent display;
   a watermarking engine configured to display a watermark on the transparent display, wherein location of the watermark indicates a current timestamp, wherein the watermarking engine is configured to change the display on the transparent display, wherein changing the display includes displaying text on the transparent display that diminishes ability to view the object through the transparent display; and
   a network interface configured to receive watermarking information from a management system and provide the watermarking information to the watermarking engine, wherein the watermarking engine generates the watermark in response to receiving the watermarking information, wherein the watermark contains watermarking information comprising a unique identifier, a validity period, a location indicator, and a signature.

2. The display case of claim 1, wherein the watermarking engine is configured to change the display on the transparent display in response to expiration of the watermark.

3. The display case of claim 2, wherein changing the display comprises increasing opacity of the display.

4. The display case of claim 1, further comprising a backup battery configured to power the transparent display and the watermarking engine when the display case is not connected to an external power source.

5. The display case of claim 4, wherein the watermarking engine is configured to change the display on the transparent display in response to power level of the backup battery reaching a threshold level.

6. The display case of claim 1, further comprising a network interface for connecting the watermarking engine to a network.

7. A computer-implemented method comprising:
   receiving, via a network interface, watermarking information from a management system;
   generating a watermark containing the watermarking information, the watermarking information comprising a unique identifier, a validity period, a location indicator, and a signature;
   displaying, on a transparent display of a display case, the watermark containing the watermarking information, wherein location of the watermark indicates a current timestamp, the transparent display for viewing an object within the display case; and
   changing the display on the transparent display, wherein changing the display includes displaying text on the transparent display that diminishes ability to view the object through the transparent display.

8. The method of claim 7, wherein changing the display on the transparent display occurs is in response to expiration of the watermark.

9. The method of claim 8, wherein changing the display comprises increasing opacity of the display.

10. The method of claim 7, wherein changing the display on the transparent display occurs in response to power level of a backup battery reaching a threshold level.

* * * * *